T. R. HULING & H. L. CRAIG.
AUTOMATIC CHUCK.
APPLICATION FILED JAN. 13, 1909.
951,530.
Patented Mar. 8, 1910.
2 SHEETS—SHEET 1.
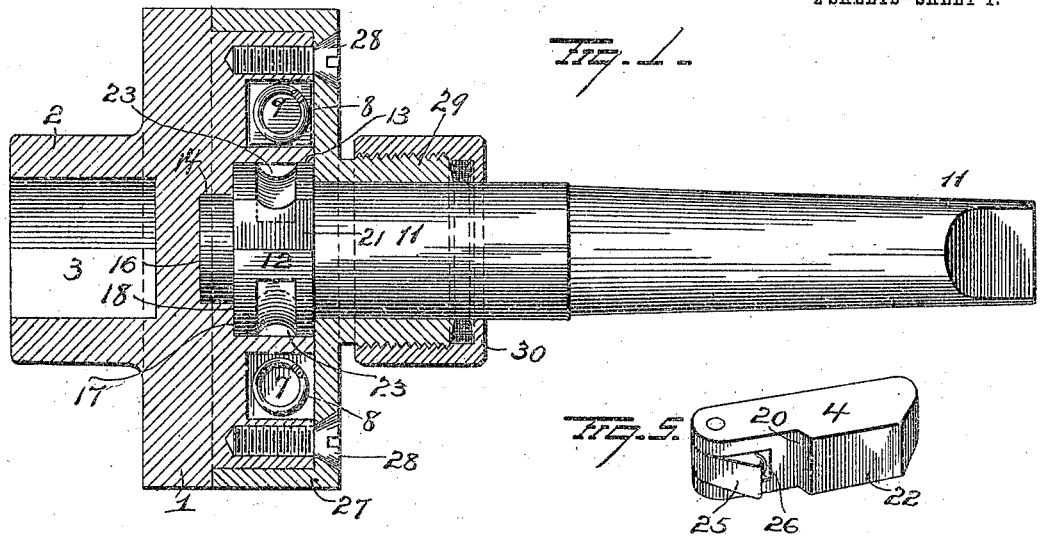
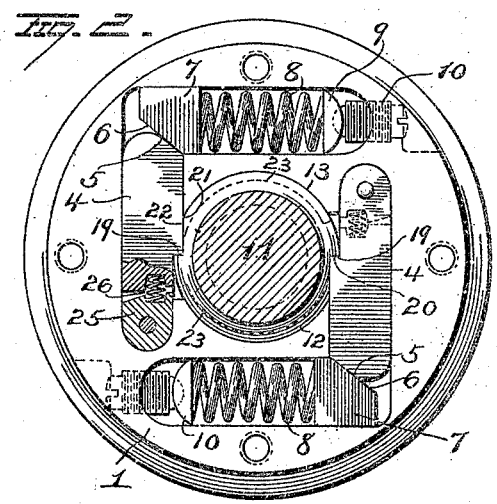
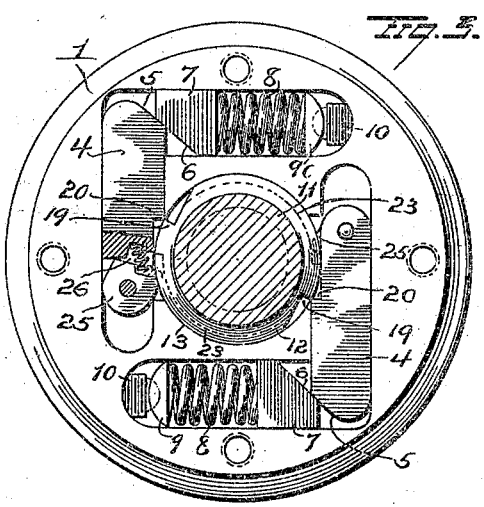
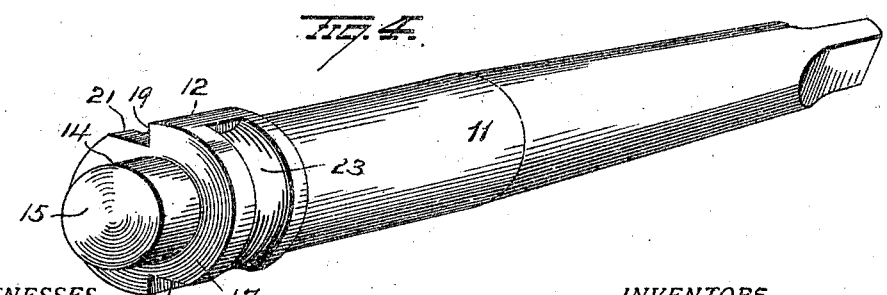
WITNESSES
E. J. Nottingham
G. J. Downing
INVENTORS
T. R. Huling
H. L. Craig
By H. A. Seymour Attorney

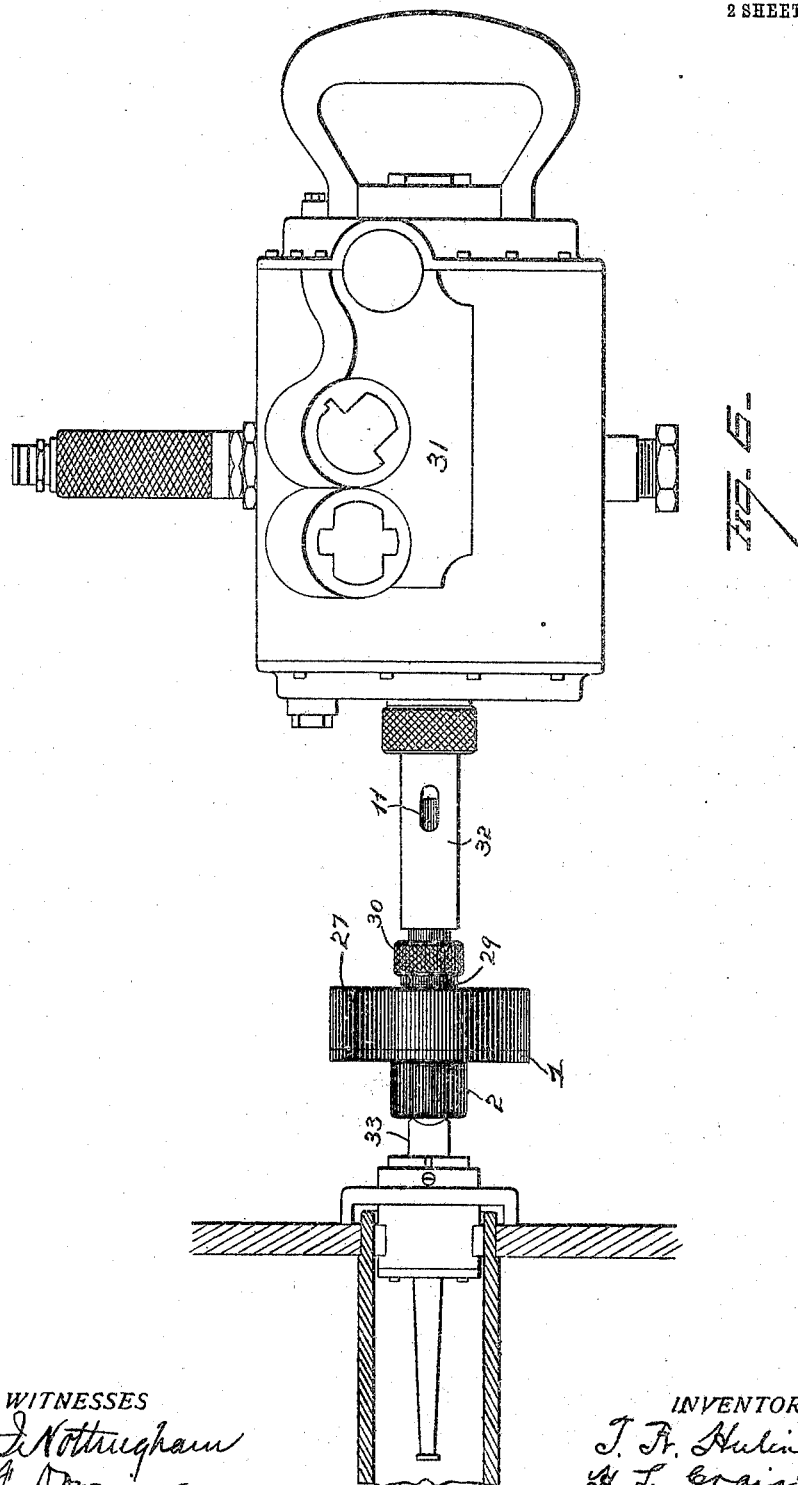

UNITED STATES PATENT OFFICE.

TORRENCE RANDOLPH HULING AND HARRIE LEONARD CRAIG, OF JERSEY SHORE, PENNSYLVANIA.

AUTOMATIC CHUCK.

951,530.  Specification of Letters Patent.  Patented Mar. 8, 1910.

Application filed January 13, 1909. Serial No. 472,102.

*To all whom it may concern:*

Be it known that we, TORRENCE R. HULING and HARRIE L. CRAIG, of Jersey Shore, in the county of Lycoming and State of Pennsylvania, have invented certain new and useful Improvements in Automatic Chucks; and we do hereby declare the following to be a full, clear, and exact description of the invention, such as will enable others skilled in the art to which it appertains to make and use the same.

Our invention relates to an improvement in automatic chucks.

The object of the improvement is to provide a chuck of such construction that it may be adjusted so as to subject the tool connected therewith to any desired maximum strain or tension and to instantly disconnect the tool from the actuating mechanism of the chuck when such maximum strain or pressure shall have been exceeded.

A further object is to provide a chuck embodying the mode of operation above set forth which will insure the prompt retraction of the tool when the chuck is rotated in the opposite direction.

With these objects in view our invention consists in certain features of construction and combinations of parts as will be hereinafter described and pointed out in the claims.

In the accompanying drawings, Figure 1 is a view in side elevation of our improvements. Fig. 2 is a view in end elevation of the chuck with its casing removed and showing the mechanism of the chuck in position when the parts are subjected to the ordinary stress or strain for which the parts are adjusted to operate. Fig. 3 is a similar view showing the position of the parts when the tool connected with the chuck is subjected to an abnormal resistance. Fig. 4 is a detached view in side elevation of the chuck spindle. Fig. 5 is a detached view of one of the chuck blocks, showing the pawl connected therewith, and Fig. 6 is a view in side elevation illustrating our automatic chuck as applied to a motor and tube expander.

1 represents the chuck casing or head provided with a hub 2 having a square or angular socket 3 formed therein for the reception of the tool to be operated by the chuck. Within the head 1 are located on opposite sides of its center two sliding blocks 4, each of which is provided at one end with a cam face 5 which engages a cam face 6 on a sliding block 7, the latter being arranged to reciprocate at right angles to the block 4. The block 7 is forced outwardly by means of a spiral spring 8 which is seated at one end on a follower 9 which is retained in any desired adjustment by means of a screw threaded shank 10 which may be operated by a screw driver from the outside of the chuck head.

11 represents the chuck spindle which is provided with an enlarged circular hub or collar 12 which accurately fits within the circular recess 13 formed in the head of the chuck. The periphery 14 of the reduced end 15 of the spindle fits within the circular recess 16 in the chuck casing or head, while the broad annular bearing 17 on the outer face of the hub or collar seats upon an annular bearing 18 in the head of the chuck. The collar or hub 12 is provided on opposite sides with shoulders 19, each of which engages a corresponding square shoulder 20 formed on the sliding blocks 4, while the flattened faces 21 adjacent to such radial shoulders fit against the inner parallel faces 22 on said sliding blocks. The hub or collar 12 is provided with two semi-circular grooves 23, each of which terminates at one end in a square shoulder 24. Each one of the sliding blocks 4 has pivoted in one of its ends a small pawl 25 which is forced outwardly by a spring 26. The operative parts of the chuck are protected and retained in place by means of the removable casing 27 which is secured to the head of the chuck by the screws 28. The removable head is provided with a screw threaded hub 29 upon which is secured an adjustable collar 30, suitable packing being interposed between the collar and the hub.

Having described the construction and relative arrangement of the several parts of our improvement we will now briefly describe its operation.

Assuming that the chuck is attached to a flue expander, as represented in Fig. 6, in which 31 is an electric motor which rotates the hollow driving shaft 32 through which rotary motion is imparted to the spindle 11 of our improved chuck. Within the annular socket 3 in the head of the chuck is received the angular end of the conical screw threaded tube expanding spindle 33. In the operation of a tube expander for instance, it is very important that the ends of the tube shall be rolled sufficiently hard to secure them in place in order to insure a tight joint, but it is equally important that sufficient pressure shall not be imposed upon the tube expander as will result in rolling the ends of the tube too hard because in that event it will result in shortening the life of the tube, owing to the fact that tubes are subjected to wide changes of temperature and if rolled too hard they will soon begin to leak and cannot be tightened again owing to the hardness of their ends. Hence in using our automatic chuck in connection with a tube expander the tension of the spiral springs is first adjusted to such a degree as will insure the rolling of the ends of the tubes sufficient to insure of their being firmly secured to the heads of the boiler, but on the other hand the adjustment is such as will release and disengage the chuck from the expander tool when the pressure or strain exceeds that for which the springs are adjusted. In the operation of the device rotary motion is imparted to the chuck spindle which in turn rotates the casing of the chuck and the expander tool, but just as soon as the tube expander meets with resistance in excess of that to which the spiral springs of the chuck has been adjusted the shoulders 19 on the collar of the chuck spindle will reciprocate the sliding blocks 4 in opposite directions and force the cam faced blocks rearwardly a sufficient distance to permit the toothed collar or hub on the spindle to completely rotate without rotating the spindle of the tube expander and thus shield the latter from excessive or abnormal strain and pressure. By reversing the motor the chuck is promptly put into operation again to rotate the tube expander in the opposite direction so as to retract it by means of the following devices. When the reciprocating blocks have been moved in opposite directions, as has been explained, to throw the tube expander out of operation it permits the pawls 25 connected with each one of said blocks to be moved or thrown outwardly by their springs so as to project into the semicircular grooves 23 in the collar or head of the chuck spindle and when the latter is rotated in the opposite direction its shoulders will engage the ends of the pawls and force the sliding blocks backwardly again into their normal position, and by continuing to rotate the chuck spindle backwardly in the same direction the tube expander is rotated backwardly therewith and retracted.

While we have described our chuck as being adapted for use in connection with a tube expander we would have it understood that we do not limit ourselves to such particular use because it may be employed for a wide variety of uses of a similar nature, and again it may be combined and operated by an electric motor, or a pneumatic motor or in a ratchet or drill press.

Having fully described our invention what we claim as new and desire to secure by Letters-Patent, is:—

1. In an automatic chuck, the combination of sliding blocks adapted to move in opposite directions, and spring actuated cam faced blocks arranged at right angles to said sliding blocks, of a chuck spindle provided with shoulders constructed to interlock with corresponding shoulders on said sliding blocks.

2. In an automatic chuck, the combination with the chuck head or casing and chuck spindle journaled in one face of the head, said spindle being provided with shoulders, of sliding blocks having shoulders adapted to interlock with the shoulders on the chuck spindle, and adjustable spring actuated blocks for resisting the movement of said sliding blocks.

3. In an automatic chuck, the combination of a chuck head or casing, sliding blocks having inclined ends, adjustable spring actuated blocks provided with inclined ends adapted to engage the inclined ends of the sliding blocks, and a chuck spindle provided with shoulders adapted to interlock with corresponding shoulders on the sliding blocks.

4. In an automatic chuck, the combination with a chuck head or casing, sliding blocks mounted therein and adapted to move in opposite directions, spring actuated blocks arranged at right angles to said sliding blocks and engaging their ends, of a chuck spindle journaled in one face of the chuck casing and provided with shoulders adapted to interlock with corresponding shoulders on said sliding blocks.

5. In an automatic chuck, the combination with a chuck head or casing, sliding blocks mounted therein, spring actuated blocks for restraining the movement of said sliding blocks and spring actuated pawls mounted in the sliding blocks, of a chuck spindle provided with shoulders adapted to engage said pawls and thereby move said sliding blocks back to their normal position.

6. In an automatic chuck, the combination with a chuck head or casing, and a chuck spindle journaled to rotate in the head or casing, of sliding blocks arranged parallel to one another and on opposite sides of the spindle, said blocks and spindle being provided with interlocking shoulders, of adjustable spring actuated blocks for restraining the movement of said sliding blocks.

7. In an automatic chuck, the combination with the head or casing of the chuck, and a spindle mounted in one face of the head so as to rotate therein and provided with a shouldered member, of reciprocating blocks, one on each side of the spindle and parallel with each other, said blocks having shoulders to interlock with the shouldered member on the spindle, spring actuated blocks constructed to engage the ends of said sliding blocks, and means for adjusting the tension of the spring actuated blocks.

In testimony whereof, we have signed this specification in the presence of two subscribing witnesses.

TORRENCE RANDOLPH HULING.
HARRIE LEONARD CRAIG.

Witnesses:
BRUCE C. WILLIAMSON,
THOMAS B. HAYS.